United States Patent [19]

Szendrő et al.

[11] 4,355,989

[45] Oct. 26, 1982

[54] GEAR UNIT FOR POWER-SAVING DRIVE OF WORKING ELEMENTS OF ROTARY OR OSCILLATORY MOTION, ESPECIALLY OF AGRICULATURAL CUTTER DRUMS AND PEG DRUMS

[75] Inventors: Péter Szendrő; János Benkö, both of Gödöllo; Imre Szabó, Budapest, all of Hungary

[73] Assignee: Godolloi Agrartudomanyi Egyetem, Gödöllo, Hungary

[21] Appl. No.: 135,269

[22] Filed: Mar. 31, 1980

[51] Int. Cl.³ .................. F16D 3/66; F16H 55/36; A01D 55/20

[52] U.S. Cl. ........................................ 474/94; 56/249; 474/195; 474/902; 464/62

[58] Field of Search ............ 474/902, 94, 195; 74/411; 192/106.2; 64/27 C, 15 C; 56/295, 249

[56] References Cited

U.S. PATENT DOCUMENTS

| 641,379 | 1/1900 | Esmond | 74/411 |
|---|---|---|---|
| 643,699 | 2/1900 | Van Duzen | 64/27 C |
| 646,652 | 4/1900 | Washington | 64/27 C |
| 958,274 | 5/1910 | Owen | 64/27 C |
| 1,348,415 | 8/1920 | Herbst | 64/27 C |
| 1,525,793 | 2/1925 | Benzon, Jr. | 64/27 C |
| 1,893,486 | 1/1933 | Black | 64/27 C |
| 3,252,304 | 5/1966 | Moody | 56/295 |
| 3,304,924 | 2/1967 | Dolza | 474/94 |

FOREIGN PATENT DOCUMENTS

| 821921 | 12/1937 | France | 474/94 |
|---|---|---|---|
| 1263979 | 5/1961 | France | 74/411 |

*Primary Examiner*—Allan D. Herrmann
*Attorney, Agent, or Firm*—Young & Thompson

[57] ABSTRACT

An agricultural cutter has in its drive train a pulley for a V-belt. Between the rim of the pulley and the spokes thereof, coil compression springs are provided, so that upon the imposition of high power demand during cutting of an agricultural product, power will be momentarily stored in the spring and then released in connection with the cutting operation.

2 Claims, 4 Drawing Figures

GEAR UNIT FOR POWER-SAVING DRIVE OF WORKING ELEMENTS OF ROTARY OR OSCILLATORY MOTION, ESPECIALLY OF AGRICULATURAL CUTTER DRUMS AND PEG DRUMS

The subject matter of the invention is a gear unit for power-saving drive of working elements of rotary or oscillatory motion, especially of agricultural cutter drums and peg drums, which is built in into the driving chain between the power source and working element of the given equipment.

It is proved both by experiments and practical experience that if blades carrying out a chipping operation are driven, in addition to the main motion perpendicular to the edge, also with an auxiliary motion along the edge, the chipping occurs not by shearing but by so-called slicing, whereby the power demand is considerably reduced.

In the agricultural machine industry this recognition is utilized in that on cutter drums the blades are fastened somewhat upturned as compared to the generatrices of the drum mantle, i.e. the generatrices and the blades are at acute angles to each other.

The drawback of this widely-used solution consists in that the auxiliary motion is not but a relative displacement as compared to the material to be chopped and therefore the blades compact the material to be chopped by consuming about 30 to 40% of the entire power.

While compacting, the load of on the edges naturally increases, which as an additional drawback, reduces the useful life of blades.

In order to eliminate these drawbacks it would be self-evident to make the auxiliary motion an absolute motion, namely an oscillatory motion. The constructions based on this conclusion are, however, all provided with independent vibrating devices requiring external power. These implements do not meet, however, the practical requirements due to their high purchase and operational costs, as well as to their uncertain operation, so that they are not widely used.

The reduction of power consumption was observed in experiments carried out with threshing machines in which an oscillatory motion was superimposed on the uniform circular motion of the rasp bars, but even these solutions are not used in the practice.

The object of the invention is the provision of a solution applicable in practice, in which an oscillatory motion, as an auxiliary motion, can be superimposed on the working main motion without any requirement for surplus power.

This task is accomplished according to the invention in such a manner that the gear unit is a flexible, power-storing and transmitting device actuated by the momentary changes of the power demand of the material fed to the equipment.

The invention is based on the recognition that the momentary power demand, in the present case the chipping power demand, of the material fed to the equipment, e.g. of the produce to be chopped, is constantly changing and the variation is utilized for producing the auxiliary motion.

As the flexible device, a mechanical part built into the driving train is to be understood, as compared to which the other elements of the driving train are rigid in a static sense, even though they may be produced of elastic structural material.

The elastic properties of the construction are such that the mechanism could be actuated but cannot considerably modify the operation of the working element, e.g. of the cutter drum, and cannot cause any quality change in the product, so that, e.g., the longitudinal size of the chopped produce should remain within the required dimensional limits.

The attribute "power-storing and transmitting", however, implies a mechanism that behaves contrary to the known spring members, on the one hand, i.e. which is characterized not at all by as perfect a damping as possible of the actuation, but rather consumes potential energy and operates without external power, i.e., without a separate power source, on the other hand.

The invention will be now described in detail by means of an embodiment in a self-propelled straw chopper. In the drawings.

Figure 1:
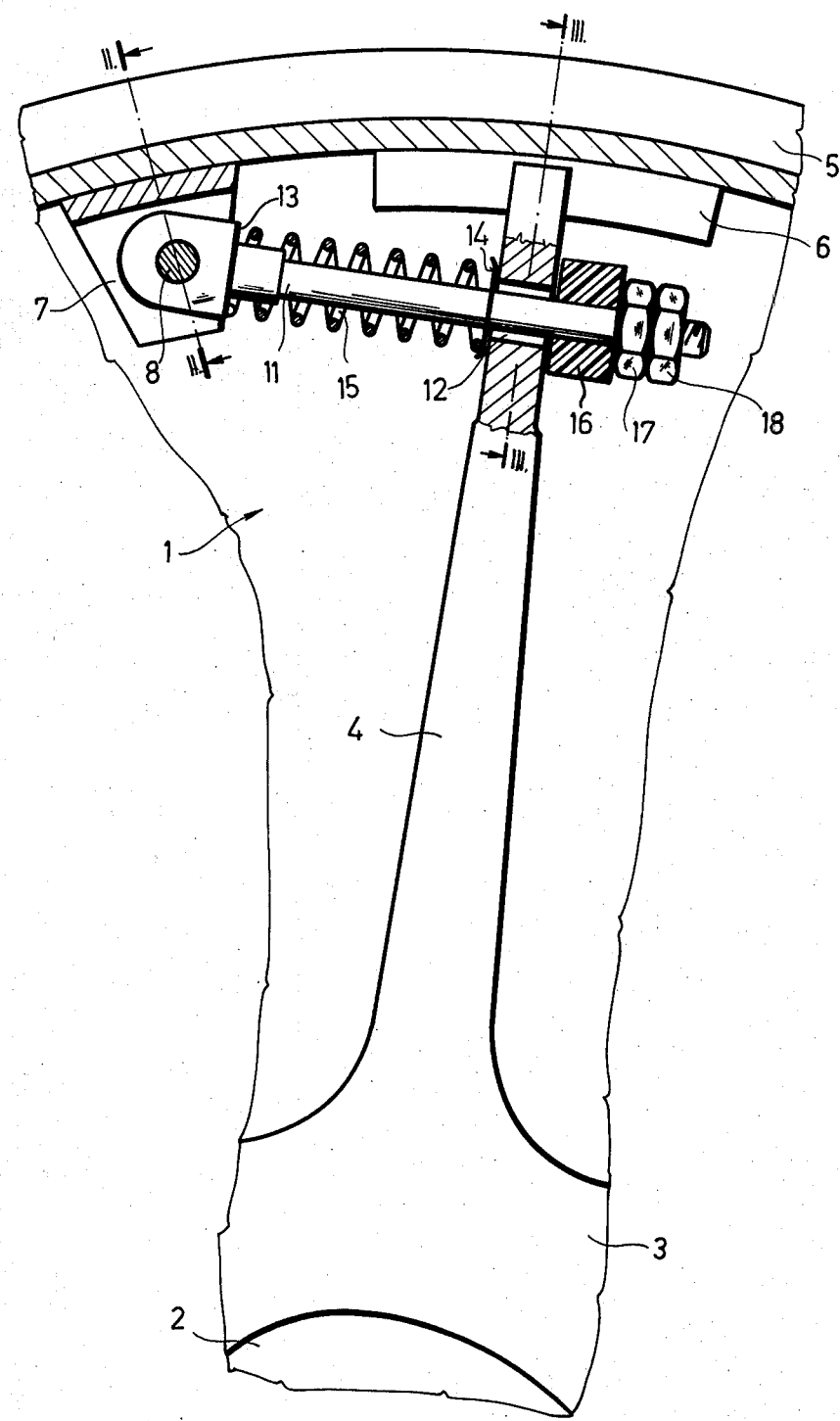
FIG. 1 is a partly broken side view.
Figure 2:
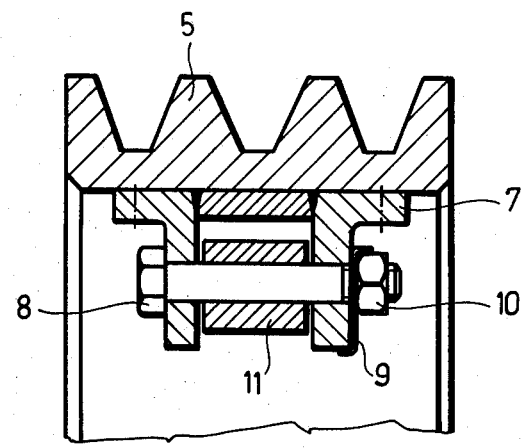
FIG. 2 shows the section taken along the line II—II of FIG. 1.
Figure 3:
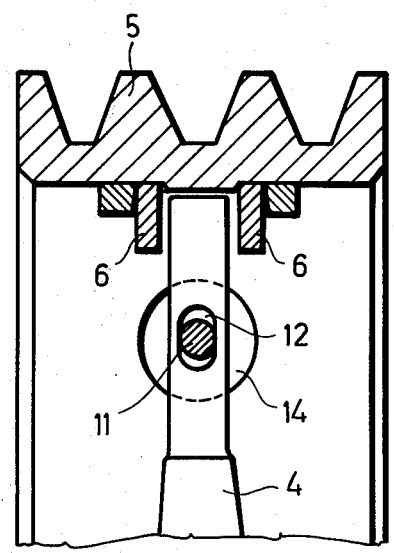
FIG. 3 is the section taken along the line III—III of FIG. 1.

The embodiment shown in the drawings has been developed for use with a self-propelled straw chopper in which the flexible, power-storing and transmitting device, according to the invention, is a V-belt pulley 1 driving the cutter drum as the last element of the driving train. This V-belt pulley 1 is wedged on the shaft 2 of the cutter drum. The distinctive particularity of the V-belt pulley 1 consists in that its hub 3 and the spoke 4 are in one piece. Its crown 5, however, is independent. The flexible elements - in a narrow sense - are built in between the spokes 4 and the crown 5. It should be noted that the power source, and the driving train of the straw chopper, and the V-belts built into the driving train and driving the V-belt pulley 1, respectively, are not shown in the drawings, on the one hand, and the V-belt operating with a definitive prestress act as a rigid body as compared to the flexible mechanism according to the invention, as mentioned above, on the other hand.

The spokes 4 of the V-belt pulley 1, according to the present invention, are positively guided one by one in a sliding manner between one pair each of guide rails 6 fastened on the inner mantle of the crown 5, in a plane perpendicular to the axle 2, along the periphery.

According to FIG. 1, to the left from the guide rails 4 a given distance, a shoe 7 is fixed through the bore of which a threaded bolt 8 extends. The threaded bolt 8 is fixed in the shoe 7 by means of a tab washer 9 and of a nut 10. On the threaded bolt 8 between the jaws of the shoe 7, the head of a pilot pin 11 is rockably supported which is led through the open-end longitudinal hole 12 in the spoke 4. Between the shoulder 13 formed on the pilot pin 11 and the washer 14 bearing against the spoke 4, a spring 15 is arranged. On the part overhanging the spoke 4 of the threaded bolt 8 a flexible washer 16 is pushed on. The clearance between the crown 5 and the spoke 4, as well as the calculated prestress of the spring 15 can be adjusted by means of a nut 17 and a counter-nut 18.

Figure 4:
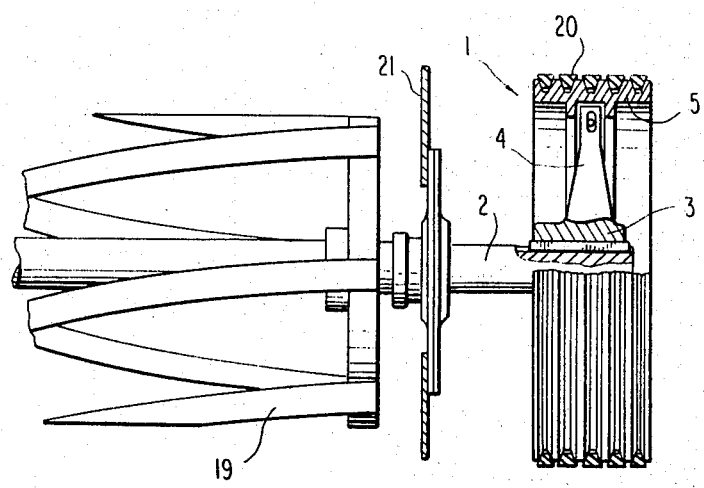
FIG. 4 is a fragmentary partial cross-section of the cutter drum and drive therefor.

The overall assembly is shown in FIG. 4, comprising a conventional cutter drum 19 fixed on the axle 2 and driven in rotation by V-belts 20 that engage with pulley 1. Axle 2 is of course rotatably supported on the frame 21 of an agricultural machine in an entirely conventional way.

It should be noted that another variant of the embodiment shown here is also conceivable in which the V-belt pulley 1 is not provided with spokes but is "solid", i.e. the crown 5 is positively guided on the hub 3 directly or at least with the intermediation of a spring 15.

In the course of experiments such a variant was also examined in which the spoke 4 is clamped between two springs 15 on the pilot pin 11. These experiments have proved, that the introduced variant is also fully capable of working.

When dimensioning the spring 15, we started from two postulations: we stated, on the one hand, that with cutter drums working with a speed of revolution of 600–1500 l/min, having a diameter of 600 mm and a blade position of 15°–20°, the amplitude of the superimposed oscillatory motion should be rated between the values of 3–3.5 mm measured on the periphery. With the observation of the permissible amplitude, the equilibrium condition of the working element and the meeting of quality demands of the product can be ensured. According to our experiments, between the diameter of the cutter drum and the permissible amplitude a linear or nearly linear relationship exists. The amplitude is decisive for the maximum compression of the spring 15.

On the other hand, the moment variation measured on the cutter drum was determined by experimental measurements, wherefrom the load and working range of the spring 15 can be calculated.

As a result of these calculations, a spring rigidity of $S=200$ N/mm was obtained with the illustrated embodiment.

In the self-propelled straw copper equipped with the devie according to the invention, the V-belt pulley 1 according to FIG. 1, was driven in clockwise direction. The structural length of the spring 15 varied always in accordance with the variation of the current cutting power demand of the fed material flow, i.e., as compared to the uniform rotary motion of the crown, the shaft and the cutter drum were always in advance or in delay, that is an oscillatory motion was superimposed on the main motion.

According to our measurements, the excitation frequency of the V-belt pulley 1 was 20–40 cps, on the basis of the assumed moment curve.

The most significant advantage of the introduced embodiment consists therefore in the power saving of about 15%. An advantageous property with respect to the practical realization consists in that the existing equipment, in the present case the self-propelled straw chopper, can be modified by replacing one single part, namely the V-belt pulley and the operation and working of the modified implement will remain unchanged, i.e. a skilled worker can operate it without any special qualification, on the one hand, and that the V-belt pulley according to the invention is simple and safe, on the other hand, i.e. the reliability of the modified implement is not decreased.

In other embodiments of the invention, the above advantages largely manifest themselves.

Numerous other variants of the solution according to the invention are conceivable within the scope of protection. Thus, from among the elements to be built into the driving train the elastic couplings of the type Bibby, Forst, or Elcard, as well as those equipped with various rubber blocks or rubber hoses, further the toothed belt are mentioned only by way of example. Their spring rigidity and spring constant shall be determined, as a matter of course, according to the demands of the given equipment and of the given field of application.

As a possible field of application, in addition to agricultural processing machines, classifying equipment is mentioned by way of example, for power-saving driving of e.g. reciprocating sieves or swinging sieves.

We claim:

1. An agricultural cutter comprising a cutter drum, a shaft on which said cutter drum is mounted for rotation, a hub on the shaft, a V-belt pulley having a peripheral crown surrounding the hub, a plurality of spokes on the hub extending radially outwardly from the hub toward the crown, and spring means between the spokes and the crown for momentarily storing and then releasing energy during the cutting of an agricultural product.

2. An apparatus as claimed in claim 1, said spring means comprising a coil compression spring acting betwen said crown and a said spoke, a pin pivotally connected to the crown between a pair of lugs on the crown, the coil compression spring surrounding the pin and acting between the spoke and that portion of the pin which is pivotally mounted between the lugs on the peripheral crown, a portion of the pin passing movably through the spoke and emerging from the side of the spoke opposite the coil compression spring, nut means on said emerging portion of the pin, and a flexible washer between the nut means and the spoke, whereby adjustment of said nut means pretensions said coil compression spring.

* * * * *